US012800838B2

(12) United States Patent
Yamashita et al.

(10) Patent No.: US 12,800,838 B2
(45) Date of Patent: Nov. 17, 2026

(54) OPTICAL SIDE INPUT/OUTPUT CIRCUIT

(71) Applicant: NTT, Inc., Tokyo (JP)

(72) Inventors: Yoko Yamashita, Musashino (JP); Takayoshi Mori, Musashino (JP); Takashi Matsui, Musashino (JP); Kazuhide Nakajima, Musashino (JP)

(73) Assignee: NTT, Inc., Tokyo (JP)

( * ) Notice: Subject to any disclaimer, the term of this patent is extended or adjusted under 35 U.S.C. 154(b) by 269 days.

(21) Appl. No.: 18/573,170

(22) PCT Filed: Jun. 28, 2021

(86) PCT No.: PCT/JP2021/024319
§ 371 (c)(1),
(2) Date: Dec. 21, 2023

(87) PCT Pub. No.: WO2023/275921
PCT Pub. Date: Jan. 5, 2023

(65) Prior Publication Data

US 2024/0369769 A1 Nov. 7, 2024

(51) Int. Cl.
*G02B 6/293* (2006.01)
*G02B 6/02* (2006.01)
(Continued)

(52) U.S. Cl.
CPC ....... *G02B 6/29323* (2013.01); *G02B 6/0208* (2013.01); *G02B 6/29317* (2013.01); *G02B 6/2852* (2013.01); *G02B 6/4287* (2013.01)

(58) Field of Classification Search
CPC ........................... G02B 6/0208; G02B 6/2852; G02B 6/29317; G02B 6/29323; G02B 6/4287
See application file for complete search history.

(56) References Cited

U.S. PATENT DOCUMENTS 4,387,954 A * 6/1983 Beasley ................. G02B 6/283 356/73.1
4,784,452 A * 11/1988 Hodge ................. G02B 6/2852 385/48

(Continued)

FOREIGN PATENT DOCUMENTS

CN 106019475 A * 10/2016 ........... G02B 6/2938
JP S63-89810 A 4/1988

(Continued)

OTHER PUBLICATIONS

Peng Ji et al, "Inline fiber optic power sensor featuring a variable tap ratio based on a tightly focused femtosecond laser inscription", optics express, vol. 26, No. 12, pp. 14972-14981, 2018.

(Continued)

*Primary Examiner* — Daniel Petkovsek
(74) *Attorney, Agent, or Firm* — Harness, Dickey & Pierce, P.L.C.

(57) ABSTRACT

An object of the present disclosure is to provide an optical side input/output circuit for allowing light for being input into or output from a side surface of an optical fiber with high efficiency.

The present disclosure is an optical side input/output circuit including: a tap unit in which a tap waveguide is formed for allowing light for propagation through a core of an optical fiber for being input into or output from a side surface of the optical fiber; and a refractive index matching unit, having a refractive index higher than a refractive index of the tap waveguide, on the side surface of the optical fiber where the light is allowed for being input or output by the tap waveguide.

12 Claims, 26 Drawing Sheets

[3B]

(51) Int. Cl.
*G02B 6/28* (2006.01)
*G02B 6/42* (2006.01)

(56) References Cited

U.S. PATENT DOCUMENTS

| | | | | |
|---|---|---|---|---|
| 5,832,156 | A | 11/1998 | Strasser et al. | |
| 5,940,556 | A | 8/1999 | Moslehi et al. | |
| 6,865,320 | B1 | 3/2005 | Westbrook | |
| 7,283,695 | B2 * | 10/2007 | Gaylord | G02B 6/02095 385/48 |
| 10,514,506 | B2 * | 12/2019 | Brusberg | G02B 6/2852 |
| 12,411,287 | B2 * | 9/2025 | Yamashita | G02B 6/4287 |
| 2003/0081902 | A1 * | 5/2003 | Blauvelt | G02B 6/1228 385/39 |
| 2003/0086651 | A1 | 5/2003 | Chang et al. | |
| 2004/0056183 | A1 | 3/2004 | Eggleton et al. | |
| 2004/0071420 | A1 | 4/2004 | Sezerman et al. | |
| 2008/0069560 | A1 | 3/2008 | Tissot et al. | |
| 2019/0025171 | A1 | 1/2019 | Whitfield, Sr. et al. | |

FOREIGN PATENT DOCUMENTS

| | | | |
|---|---|---|---|
| JP | S63-100408 | A | 5/1988 |
| JP | 2006235380 | A | 9/2006 |
| JP | 2011-232706 | A | 11/2011 |
| KR | 101782593 | B1 | 9/2017 |
| WO | 2006053444 | A1 | 5/2006 |

OTHER PUBLICATIONS

Y. Shani et al, "Integrated Optic Adiabatic Devices on Silicon," IEEE J. Quantum Electron., vol. 27, No. 3, pp. 556-566, 1991.

Masanori Koshiba, "Basics of Wave Analysis", edited by the Institute of Electronics, Information and Communication Engineers, Corona Publishing Co., Ltd., 12 pages, 2002.

* cited by examiner

[4]

[5]

[6B]

[7]

[8]

[9]

dt = 8.4um
δn = 0.005811
R = 4113.9 μm
length = 710 μm

[10]

[11]

[12]

[13]

[14A]

[14B]

[14C]

[15]

[16]

[17A]

[17B]

[18A]

[18B]

[19]

OPTICAL SIDE INPUT/OUTPUT CIRCUIT

CROSS-REFERENCE TO RELATED APPLICATIONS

This application is a 371 U.S. National Phase of International Application No. PCT/JP2021/024319, filed on Jun. 28, 2021. The entire disclosure of the above application is incorporated herein by reference.

TECHNICAL FIELD

The present disclosure relates to an optical side input/output circuit for allowing light for being input into or output from a side surface of an optical fiber.

BACKGROUND ART

As an optical branching technique, a wavelength multiplexing coupler or the like using an arrayed waveguide grating is known. Also, to realize optical sensing and monitoring of a transmission path, an optical side output technique using a tap waveguide has been suggested. In the tap waveguide, an optical waveguide is formed by laser processing in an optical fiber, and part of the power of light is output from the core (see Non Patent Literature 1, for example).

CITATION LIST

Non Patent Literature

Non Patent Literature 1: Peng Ji et al, optics express, vol. 26, no. 12, p 14972-14981, (2018) Non Patent Literature 2: Y. Shani et al, "Integrated Optic Adiabatic Devices on Silicon," IEEE J. Quantum Electron., vol. 27, no. 3, pp. 556-566, 1991.

Non Patent Literature 3: Masanori Koshiba, "Basics of Wave Analysis", edited by The Institute of Electronics, Information and Communication Engineers, CORONA PUBLISHING CO., LTD., 2002

SUMMARY OF INVENTION

Technical Problem

When a grating and a tap waveguide are combined, light with a wavelength desired to be wavelength-selectively extracted by the grating can be coupled to the tap waveguide. In this case, since the incident angle in the optical fiber becomes equal to or larger than the critical angle, the light from the tap waveguide cannot be output to the outside of the optical fiber.

Therefore, in order to solve the above problem, an object of the present disclosure is to provide an optical side input/output circuit for allowing light for being input into or output from a side surface of an optical fiber with high efficiency.

Solution to Problem

In order to solve the above problem, a refractive index matching unit is provided on the side surface of the optical fiber where the light is allowed for being input or output by the tap waveguide.

In order to solve the above problem, the tap waveguide has an outward curve in the vicinity of the side surface of the optical fiber where the light is allowed for being input or output by the tap waveguide.

Specifically, the present disclosure is an optical side input/output circuit including:

a tap unit in which a tap waveguide is formed for allowing light for propagation through a core of an optical fiber for being input into or output from a side surface of the optical fiber; and a refractive index matching unit, having a refractive index higher than a refractive index of the tap waveguide, on the side surface of the optical fiber where the light is allowed for being input or output by the tap waveguide.

According to this structure, it is practical to provide an optical side input/output circuit for allowing light for being input into or output from the side surface of the optical fiber with high efficiency.

In addition, in the present disclosure, the tap waveguide is assigned linearly with an assignment in a cladding approaching the core of the optical fiber and assigned to an outward curve with the assignment in the cladding staying away from the core.

Furthermore, the present disclosure is an optical side input/output circuit including a tap unit in which a tap waveguide is formed for allowing light for propagation through a core of an optical fiber for being input into or output from a side surface of the optical fiber, in which the tap waveguide is assigned linearly with an assignment in a cladding approaching the core of the optical fiber and assigned to an outward curve with the assignment in the cladding staying away from the core.

According to this structure, it is practical to provide an optical side input/output circuit for allowing light for being input into or output from the side surface of the optical fiber with high efficiency.

Furthermore, the present disclosure further includes a grating unit in which a grating is formed for converting light of a basic mode, with a desired wavelength transmitted therethrough, of the light for propagation through the core of the optical fiber to light of a higher-order mode, in which the tap unit allows the light of the higher-order mode, finishing transmission through the grating unit, for being input into or output from the side surface of the optical fiber.

Furthermore, the present disclosure further includes a grating unit in which a grating is formed for reflecting light, with a desired wavelength, of the light for propagation through the core of the optical fiber, in which the tap unit allows the light, reflected by the grating unit, for being input into or output from the side surface of the optical fiber.

Furthermore, in the present disclosure, the curve is a part of an arc.

Furthermore, in the present disclosure, a radius of the arc is larger than 4 mm and smaller than 410 mm.

Furthermore, in the present disclosure, a boundary surface between the optical fiber and the refractive index matching unit is flat in a cross section perpendicular to a longitudinal direction of the optical fiber.

Furthermore, in the present disclosure, a boundary surface between the optical fiber and the refractive index matching unit is recessed in a center axis direction of the optical fiber in a cross section perpendicular to a longitudinal direction of the optical fiber.

Note that the disclosures described above can be combined in any possible manner.

Advantageous Effects of Invention

According to the present disclosure, it is practical to provide an optical side input/output circuit for allowing light for being input into or output from the side surface of the optical fiber with high efficiency.

DESCRIPTION OF EMBODIMENTS

Figure 1:
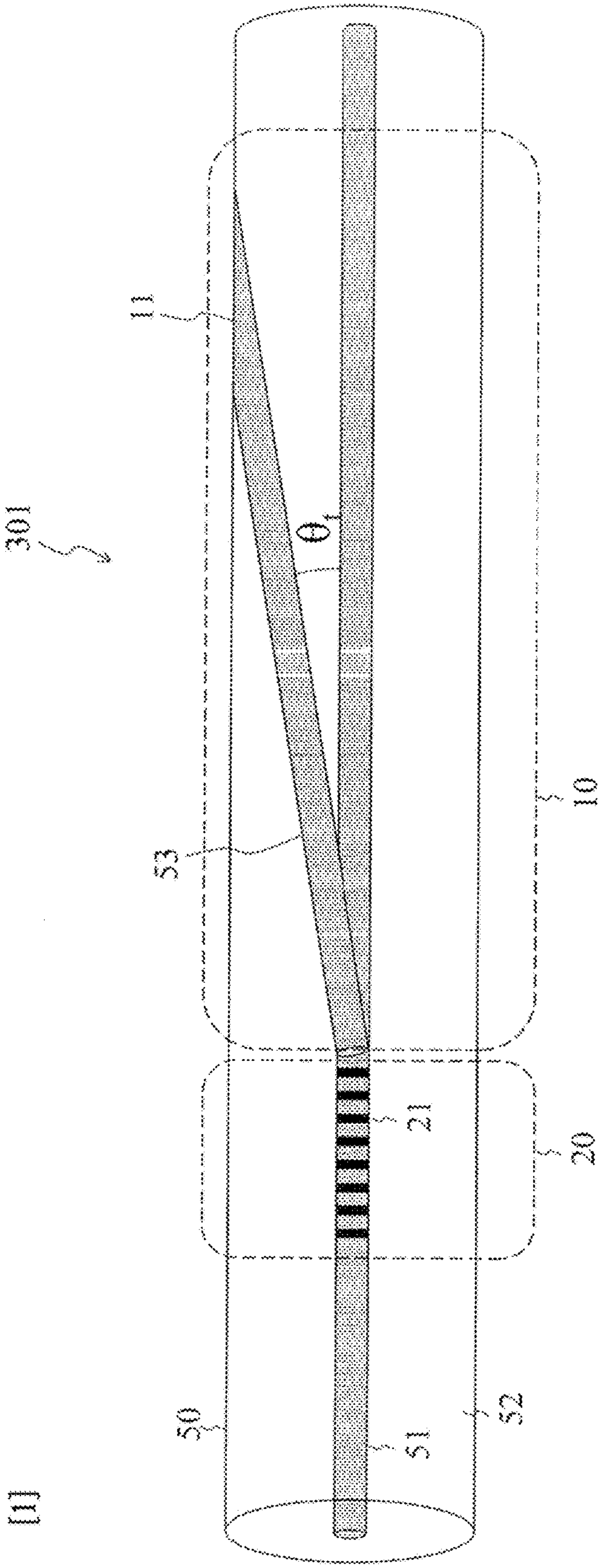
FIG. 1 is a diagram for explaining a structure of an optical side input/output circuit.

Embodiments of the present disclosure will be described in detail below with reference to the drawings. Note that the present disclosure is not limited to the embodiments described below. These examples are merely examples, and the present disclosure can be carried out in a form with various modifications and improvements based on the knowledge of those skilled in the art. Note that components having the same reference numerals in the present specification and the drawings denote the same components.

First Embodiment

Examples of an optical side input/output circuit including a grating unit and a tap unit described in an embodiment are as follows.

Type A: an optical side input/output circuit including: a grating unit in which a grating is formed for converting light of a basic mode, with a desired wavelength transmitted therethrough, of light for propagation through a core of an optical fiber to light of a higher-order mode; and a tap unit for allowing light of the higher-order mode, finishing transmission through the grating unit, for being input into or output from a side surface of the optical fiber.

Type B: an optical side input/output circuit including: a grating unit in which a grating is formed for reflecting light, with a desired wavelength, of light for propagation through a core of an optical fiber, and a tap unit for allowing the light, reflected by the grating unit, for being input into or output from a side surface of the optical fiber.

In the type B optical side input/output circuit, light passing through the tap unit is transmitted without being coupled to the tap waveguide, only light with a desired wavelength is reflected by the grating of the grating unit, for example, a fiber Bragg grating (FBG), and the reflected light is returned to the tap unit and coupled to the tap waveguide (see, for example, Non Patent Literature 1).

Figure 2A:
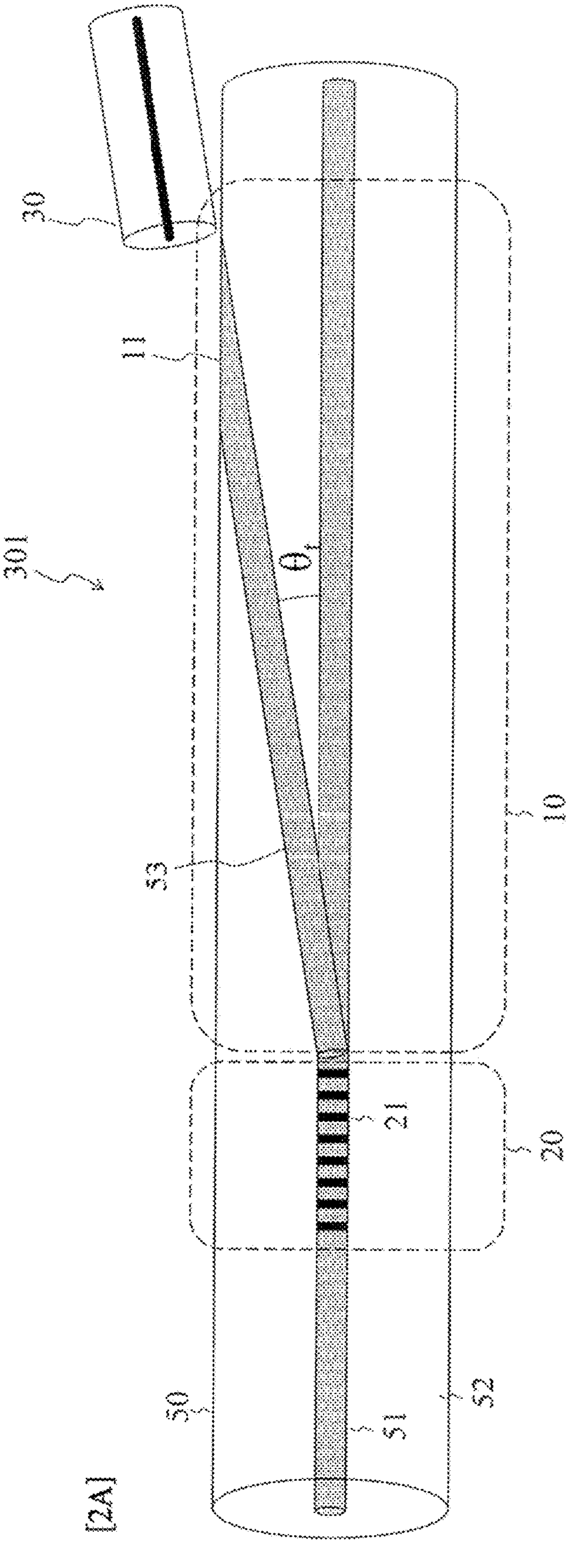
FIG. 2A is a diagram for explaining a structure of the optical side input/output circuit.
Figure 2B:
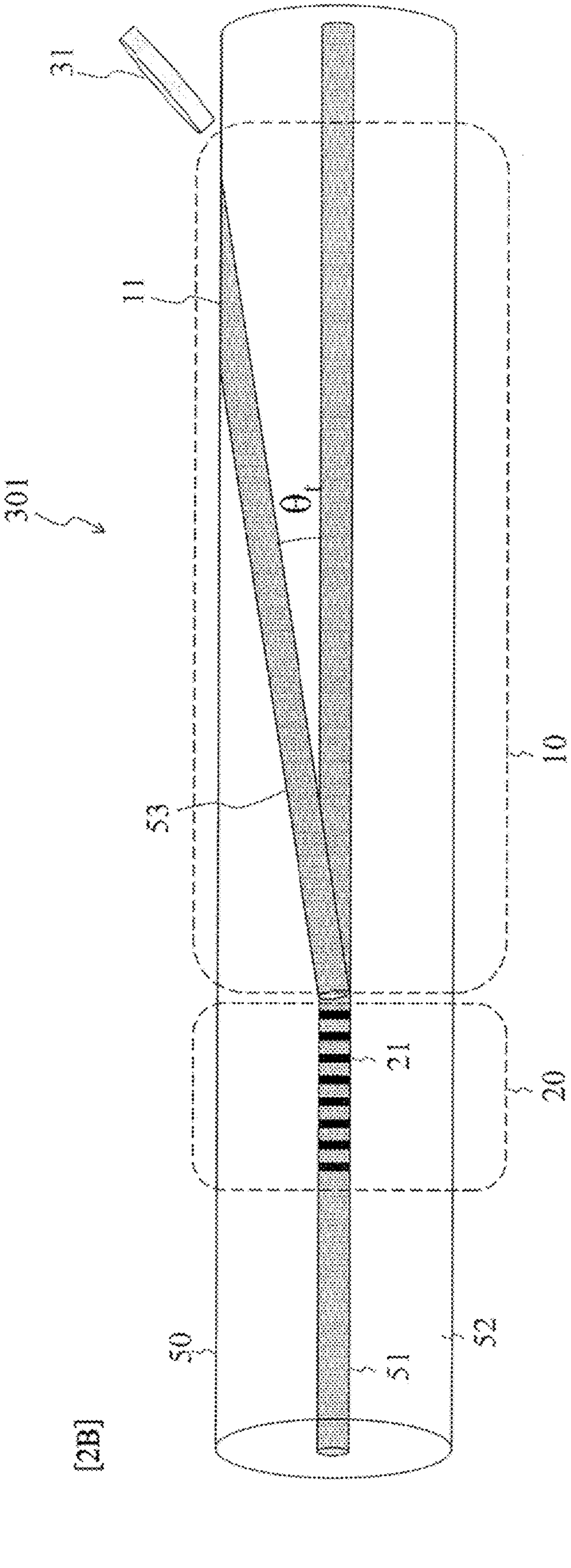
FIG. 2B is a diagram for explaining a structure of the optical side input/output circuit.

A structure of the type A optical side input/output circuit including the grating unit and the tap unit is illustrated in FIGS. 1, 2A, and 2B. In FIGS. 1, 2A, and 2B, the reference numeral 10 denotes a tap unit, 11 denotes an emission end, 20 denotes a grating unit, 21 denotes a long-period fiber grating (LPG), 30 denotes a light-receiving fiber, 31 denotes a mirror, 50 denotes an optical fiber, 51 denotes a core, 52 denotes a cladding, 53 denotes a tap waveguide, and 301 denotes an optical side input/output circuit.

The optical fiber 50 includes the core 51 and the cladding 52, and the core is of a step index type. The grating unit 20, in which the long-period fiber grating (LPG) 21 is formed, and the tap unit 10 formed with the tap waveguide 53 are provided in a longitudinal direction of the optical fiber 50. The tap waveguide 53 is assigned linearly with the assignment in the cladding 52 approaching the core 51.

The long-period fiber grating (LPG) 21 converts light of a basic mode LP01, with a desired wavelength transmitted therethrough, of light propagating through the core 51 from a direction (left direction in the drawing) opposite to the tap unit 10, to light of a higher-order mode, for example, an LP11 mode with the desired wavelength. The tap waveguide 53 guides the light of the higher-order mode from the grating unit 20 and allows the light for being output to the outside from the emission end 11 of the side surface of the optical fiber 50. When light from the outside is coupled to the core 51 of the optical fiber 50, the operation is reversed.

In the example of the type B optical side input/output circuit, the fiber Bragg grating (FBG) reflects light, with a desired wavelength, of light propagating through the core 51 from the same direction (right direction in the drawing) as the tap unit, and the tap waveguide guides the light reflected by the fiber Bragg grating (FBG) and allows the light for being output to the outside from the emission end 11 of the side surface of the optical fiber 50. When light from the outside is coupled to the core 51 of the optical fiber 50, the operation is reversed.

In the following embodiment, the type A optical side input/output circuit will be described as an example, but the description is similarly applicable to the type B optical side input/output circuit.

The long-period fiber grating (LPG) 21 of the grating unit 20 can be manufactured, for example, by femtosecond laser machining, CO2 laser machining, or grating pressing. The tap unit 10 includes a cylindrical tap waveguide 53 that passes through the cladding 52 at an angle θt from the center of the core 51, and selectively extracts the higher-order mode, for example, only the LP11 mode by controlling the angle θt between the tap waveguide 53 and the core 51, the waveguide diameter of the tap waveguide, and the refractive index of the tap waveguide. The tap waveguide 53 can be manufactured using femtosecond laser processing, in which irradiation with laser produces refractive index modulation of δn. The coupling efficiency from the core 51 to the tap waveguide 53 strongly depends on the mode, and the numerical aperture (NA) increases as the mode becomes further higher-order mode, so that the coupling to the tap waveguide 53 becomes easier. By appropriately setting the parameters of the tap waveguide 53, only the higher-order mode can be brought to transition to the tap waveguide 53. Here, to couple the higher-order mode to the tap waveguide 53 with high efficiency, and limit the basic mode to propagation inside the core 51, it is important to make the angle θt sufficiently smaller, and transition the mode gradually (see Non Patent Literature 2, for example).

The light emitted from the tap waveguide 53 can be directly received by a photodetector, but as illustrated in FIG. 2A, the light receiving fiber 30 can be brought close to the emission end 11 of the tap unit 10 to receive the light output from the tap waveguide 53. As illustrated in FIG. 2B, by controlling light output using the mirror 31 or a lens (not illustrated), it is practical to achieve path control such as partially propagating light in another direction in the transmission path.

Figure 3A:
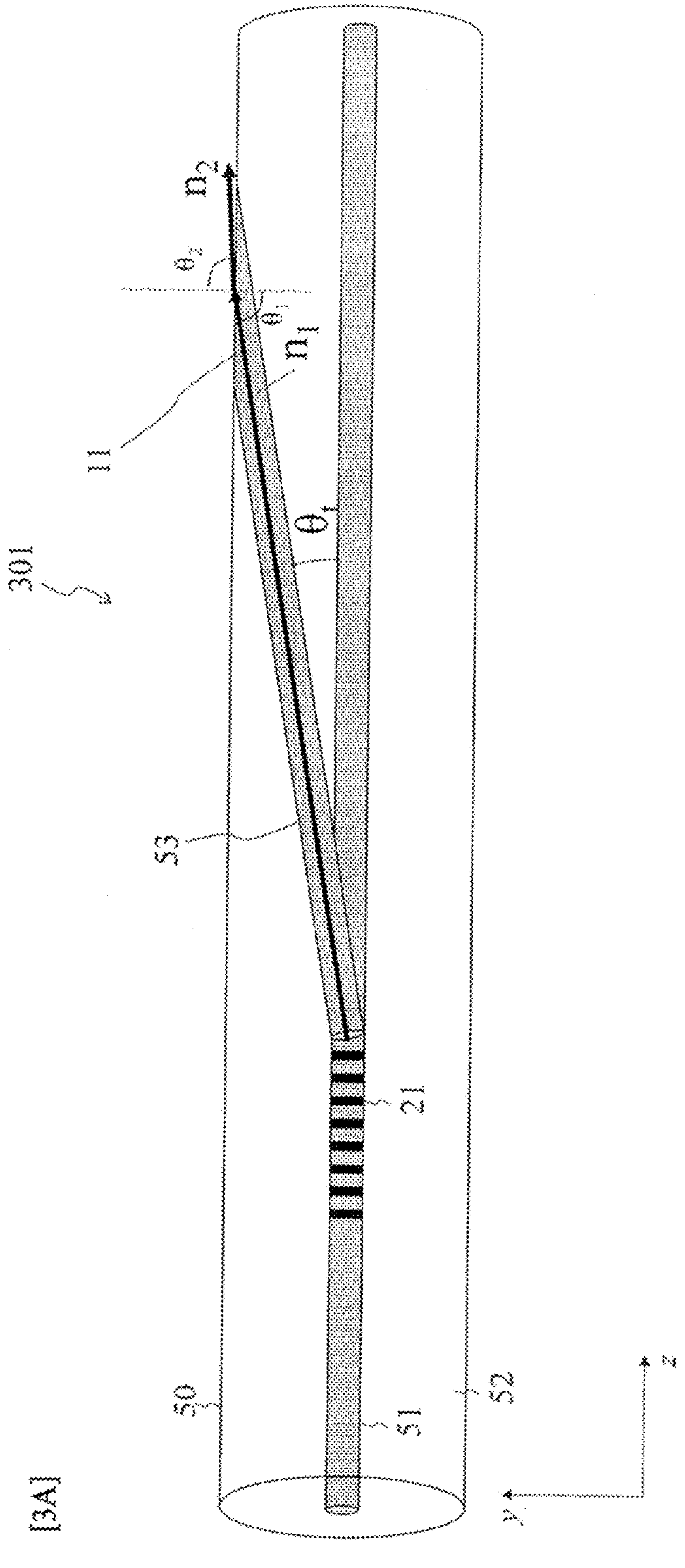
FIG. 3A is a diagram for explaining a structure of an optical side input/output circuit of the present disclosure.
Figure 3B:
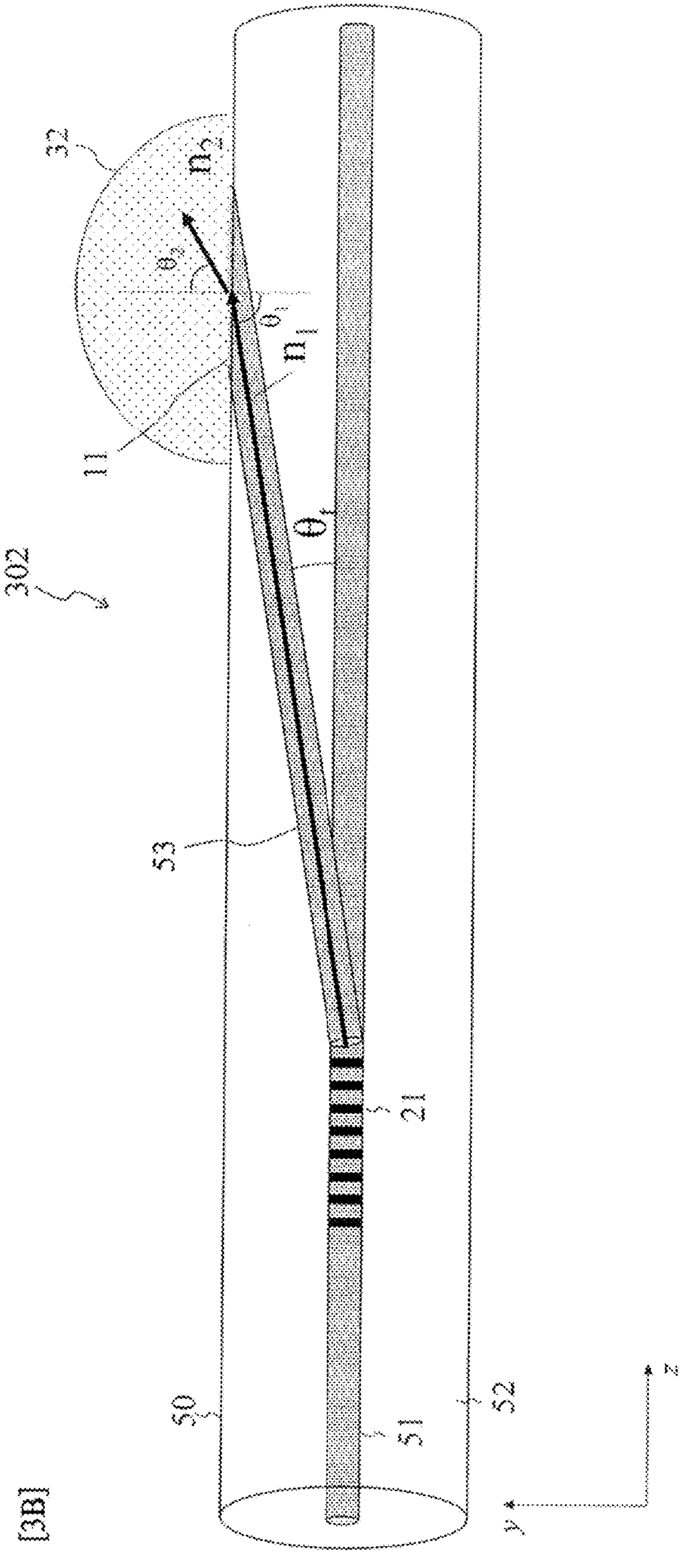
FIG. 3B is a diagram for explaining a structure of the optical side input/output circuit of the present disclosure.

A structure of the optical side input/output circuit including the grating unit and the tap unit is illustrated in FIGS. 3A and 3B. In FIGS. 3A and 3B, the reference numeral 11 denotes an emission end, 21 denotes a long-period fiber grating (LPG), 32 denotes a refractive index matching unit, 50 denotes an optical fiber, 51 denotes a core, 52 denotes a cladding, 53 denotes a tap waveguide, and 301, 302 denote optical side input/output circuits.

FIGS. 3A and 3B are schematic diagrams of light beams in a cross-sectional direction of an optical fiber yz. Assuming that the refractive index of the tap waveguide 53 is n1, the refractive index outside the optical fiber 50 from which light is emitted is n2, and the angle between the tap waveguide 53 and the normal line of the side surface of the optical fiber 50 is the incident angle θ1, the emission angle θ2 is obtained from Snell's law. Here, since the light output from the side surface of the optical fiber 50 is not parallel light, the beam spreads as it propagates. In order to inhibit deterioration of coupling efficiency due to beam spreading, it is necessary to bring a light receiving fiber, a mirror, or the like close to an emission end. Therefore, θ2 is desirably small.

In FIG. 3A, emission into air is considered. Given that n2=1 and the refractive index of the tap waveguide 53 satisfies n1=1.45, the critical angle θc is obtained as θc=43.6 degrees by using the following expression from Snell's law.

$$\theta_c = \sin^{-1}\left(\frac{n_2}{n_1}\right) \qquad \text{[Math. 1]}$$

In order to set θ1=43.6 degrees, it is necessary to set θt>46.4 degrees. In the tap waveguide 53, an optimum value is around θt=0.1 to 0.3 degrees, and light cannot be coupled to the tap waveguide 53 under the condition of θt>46.4 degrees.

Therefore, as in the optical side input/output circuit 302 in FIG. 3B, the refractive index matching unit 32 having a refractive index higher than the refractive index n1 of the tap waveguide 53 is brought into close contact with the emission end 11 of the optical fiber 50, so that θ2 can be reduced. For example, it is conceivable to arrange the refractive index matching unit 32 such as a refractive index matching material or a glass material satisfying n1<n2 at the emission end.

Figure 4:
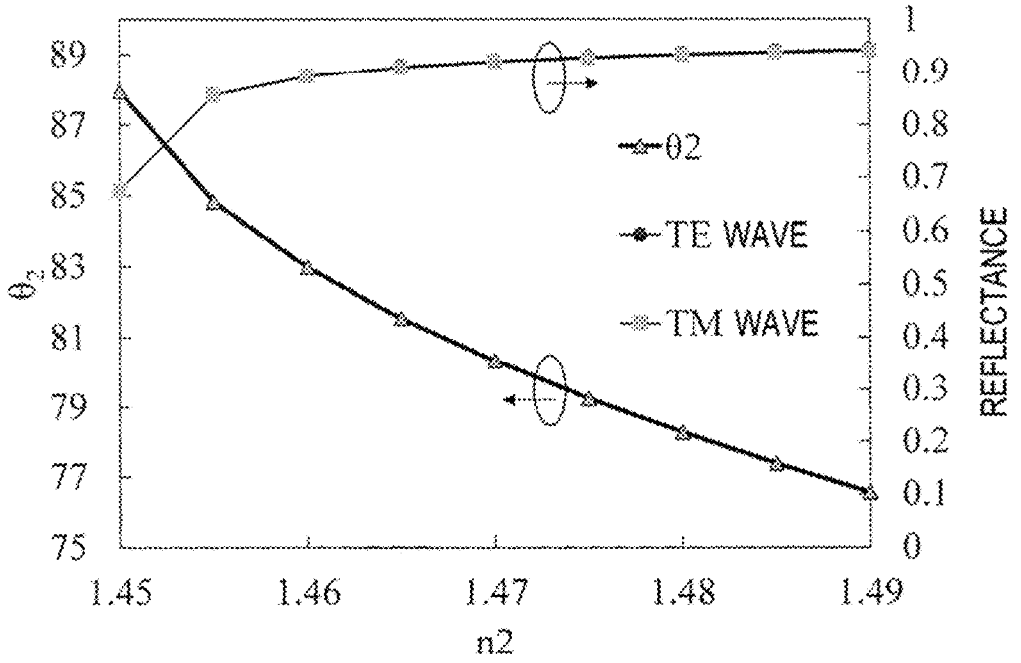
FIG. 4 is a graph for explaining the characteristics of the optical side input/output circuit of the present disclosure.

As an example, FIG. 4 illustrates dependence of the emission angle θ2 and the reflectance on the refractive index n2 on the basis of θt=0.1 degrees, θ1=89.9 degrees, and n1=1.45. Here, n2 is obtained by the following expression.

$$n_2 = \frac{n_1 \sin\theta_1}{\sin\theta_2} \qquad \text{[Math. 2]}$$

The reflectance is obtained by the following expression (see Non Patent Literature 3, for example).

$$R_p = \left(\frac{\sin(\theta_1 - \theta_2)}{\sin(\theta_1 + \theta_2)}\right)^2 \qquad \text{[Math. 3-1]}$$

for TE wave $$R_p = \left(\frac{\tan(\theta_1 - \theta_2)}{\tan(\theta_1 + \theta_2)}\right)^2 \qquad \text{[Math. 3-2]}$$

for TM wave

From FIG. 4, θ2 can be reduced by increasing n2.

As described above, by providing the refractive index matching unit, having a refractive index higher than the refractive index n1 of the cladding, on the side surface of the optical fiber serving as the emission end of the tap waveguide, light to the tap waveguide or light from the tap waveguide can be input or output with high efficiency.

Second Embodiment

Figure 6A:
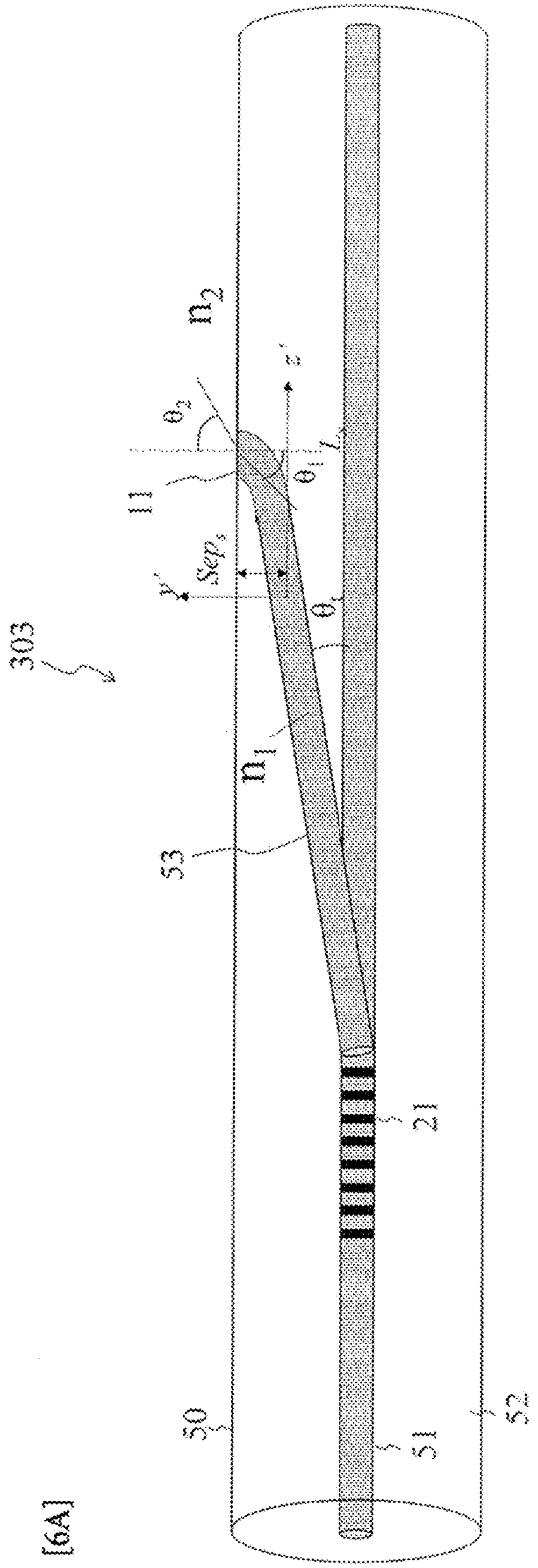
FIG. 6A is a diagram for explaining a structure of the optical side input/output circuit of the present disclosure.

A structure of the optical side input/output circuit including the grating unit and the tap unit is illustrated in FIG. 6A. In FIG. 6A, the reference numeral 11 denotes an emission end, 21 denotes a long-period fiber grating (LPG), 50 denotes an optical fiber, 51 denotes a core, 52 denotes a cladding, 53 denotes a tap waveguide, and 303 denotes an optical side input/output circuit.

As a method of reducing the emission angle θ2, it is considered to reduce the incident angle θ1. In order to reduce θ1, the tap waveguide 53 is assigned linearly with an assignment in the cladding approaching the core 51, and the tap waveguide 53 is assigned to an outward curve with the assignment of the tap waveguide 53 in the cladding staying away from the core 51. FIG. 6A illustrates a shape of the tap waveguide. The curve desirably has a small bending loss and a small θ1. A part of an arc (hereinafter, referred to as an "arc shape"), a part of an exponential function (hereinafter, referred to as "exponential function shape"), and a part of a tangent wave (hereinafter, referred to as "tangential wave shape"), which are functions passing through (y', z')=(0, 0) and rising from 0 to the light, are set as possibilities for the curve of the tap waveguide. When the coordinate axes, starting from the start point of the curve, of the tap waveguide are defined as y' and z', each curve of tap waveguide is defined by the following expression. y', z', and radius R of the arc are expressed in units of μm.

(1) In the Status of Arc Shape $$y' = R - \sqrt{R^2 - z'^2} \quad \text{[Math. 4-1]}$$

(2) In the Status of Exponential Function Shape $$y' = e^{az'} - 1 \quad \text{[Math. 4-2]}$$

(3) In the status of tangential wave shape $$y' = \tan(bz') \quad \text{[Math. 4-3]}$$

R, a, and b are parameters, individually.

Each coefficient is obtained from the incident angle θ1 at the emission end 11 of the tap waveguide 53 and the distance Seps in the y' direction from the curve of the tap waveguide 53 to the emission end 11. The relationship between θ1 and each parameter is obtained as follows. Here, the y' coordinate at the emission end is set to Seps as illustrated in FIG. 6A. A relationship between R, a, and b and Seps is determined as follows.

(1) In the Status of Arc Shape

Figure 7:
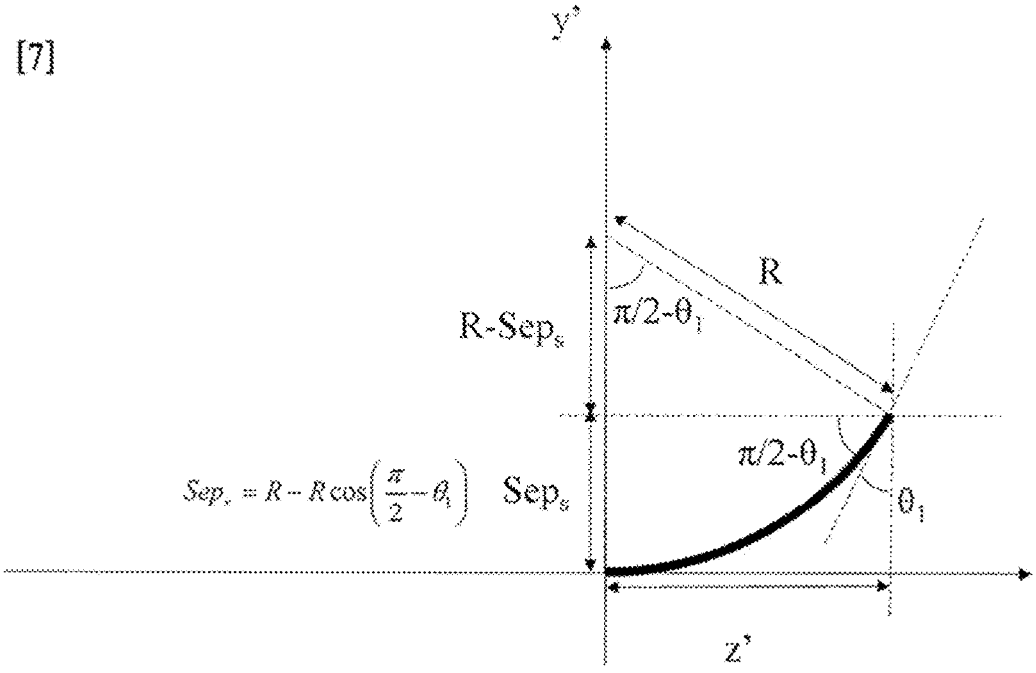
FIG. 7 is a graph for explaining the characteristics of the optical side input/output circuit of the present disclosure.

FIG. 7 illustrates parameters of the curve of the tap waveguide 53 that is an arc shape. In FIG. 7, R is a radius of the arc.

$$R = \frac{Sep_s}{1 - \sin\theta_1} \quad \text{[Math. 5-1]}$$

(2) In the Status of Exponential Function Shape

It is sufficient that, given Expression 5-2, $$y' = e^{az'} - 1 = Sep_S \quad \text{[Math. 5-2]}$$

the relationship between the inclination $$m = \frac{dy'}{dz} = ae^{az'} \quad \text{[Math. 5-3]}$$

and θ1 is as the following expression.

$$\theta_1 = \frac{\pi}{2} - \tan^{-1}(m) \quad \text{[Math. 5-4]}$$

By substituting Expressions 5-2 and 5-3 into Expression 5-4, $$a = \frac{\tan\left(\frac{\pi}{2} - \theta_1\right)}{Sep_s + 1} \quad \text{[Math. 5-5]}$$

can be obtained.

(3) In the Status of Tangential Wave Shape

It is sufficient that, given Expression 5-6, $$y' = \tan(bz') = Sep_s \quad \text{[Math. 5-6]}$$

the relationship between the inclination $$m = \frac{dy'}{dz} = \frac{1}{b\cos^2(bz)} \quad \text{[Math. 5-7]}$$

and θ1 is as the following expression.

$$\theta_1 = \frac{\pi}{2} - \tan^{-1}(m) \quad \text{[Math. 5-8]}$$

By substituting Expressions 5-6 and 5-7 into Expression 5-8, $$b = \frac{\tan\left(\frac{\pi}{2} - \theta_1\right)}{1 + Sep_s^2} \quad \text{[Math. 5-9]}$$

can be obtained.

Given Seps=62.5 μm and θ1=85 degrees, the length Ls of the curve of the tap waveguide in the direction along the z' axis and each coefficient are calculated as follows.

(1) In the Status of Arc Shape

Ls=1431.5 μm, R=16424.45 μm (2) In the Status of Exponential Function Shape

Ls=3012.86 μm, a=0.001378 $\mu m^{-1}$ (3) In the Status of Tangential Wave Shape $$Ls = 69102.0\,\mu\text{m},\ b = 2.24 \times 10^{-5}\ \mu\text{m}^{-1}$$

Figure 8:
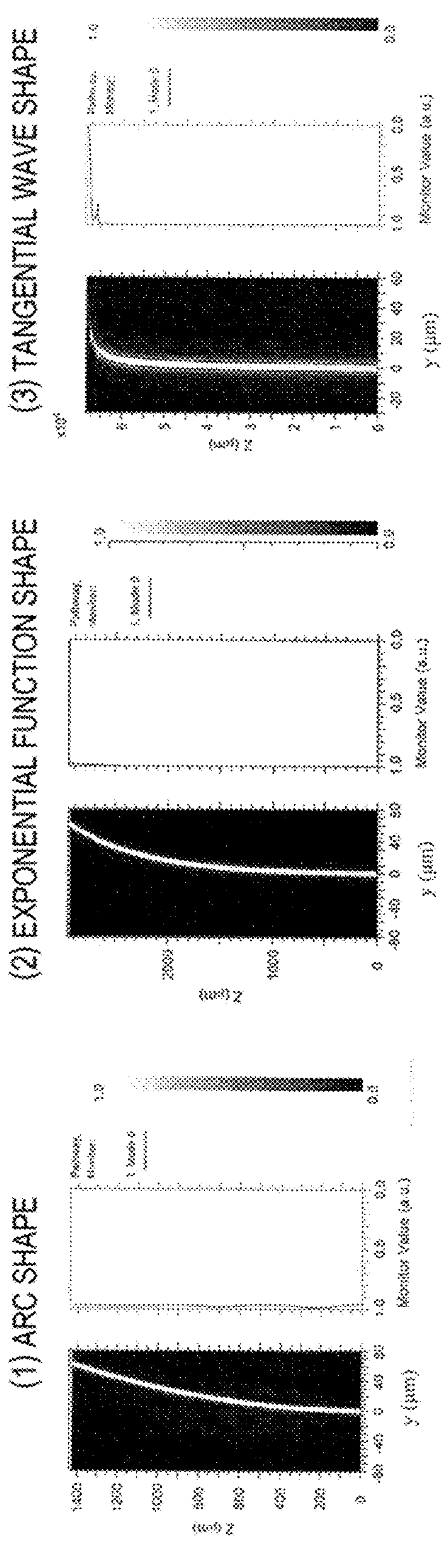
FIG. 8 is a graph for explaining the characteristics of the optical side input/output circuit of the present disclosure.

FIG. 8 illustrates the electric field distribution and the transmittance of the tap waveguide alone in changing the waveguide center coordinates to (1) an arc shape, (2) an exponential function shape, and (3) a tangential wave shape on the basis of the diameter dt of the tap waveguide 53=8

μm, the refractive index difference δn between the tap waveguide 53 and the cladding 52=0.005811, Seps=62.5 μm, and θ1=5 degrees.

In FIG. 8, (3) in the tangential wave shape, the loss is large due to steep bending and the transmittance is almost zero, and thus the tangential wave shape is difficult to be applied to the present technology. When the (1) arc shape is compared with the (2) exponential function shape, the loss is almost the same, but the (1) arc shape has Ls shorter by about 50% than that of the (2) exponential function shape. When the tap waveguide is manufactured by laser processing, a propagation loss occurs, and thus the shorter the length, the more the loss can be prevented. Therefore, it is considered that the most efficient emission can be performed by forming the vicinity of the emission end of the tap waveguide 53 into an arc-shaped curved shape.

Figure 9:
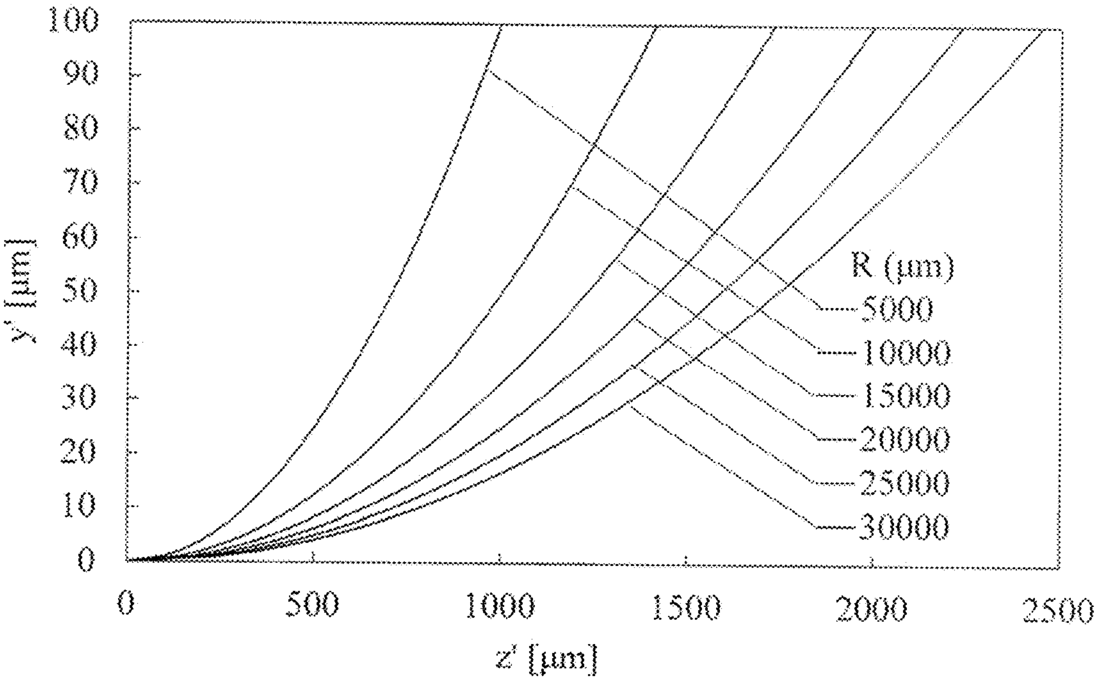
FIG. 9 is a graph for explaining the characteristics of the optical side input/output circuit of the present disclosure.

FIG. 9 illustrates y' and z' coordinates of the center of the waveguide, on the basis of Seps=62.5 μm, with a change in R. It can be seen that the bending becomes gentler with R increased and Seps constant. By reducing R, θ1 is reduced, and the light is easily coupled to the light receiving fiber. On the other hand, sharp bending increases the bending loss and deteriorates the emission power.

Figure 10:
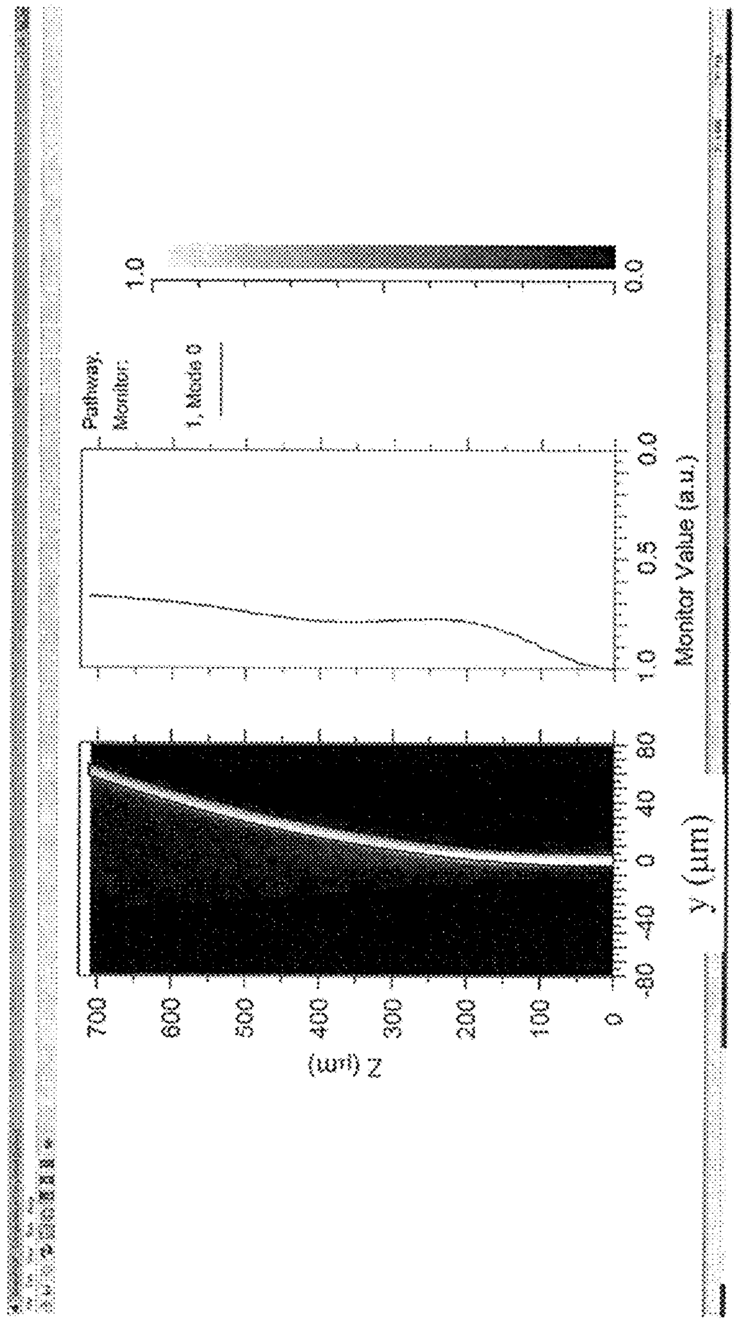
FIG. 10 is a graph for explaining the characteristics of the optical side input/output circuit of the present disclosure.

FIG. 10 illustrates (a) the electric field distribution and (b) the transmittance of the tap waveguide alone on the basis of R=4.1 mm such that θ1=10 degrees are satisfied. Here, Seps is a maximum value that can be taken on condition that an optical fiber having a diameter of 125 μm is assumed. In this illustration, Seps=62.5 μm, dt=8.4 μm, and δn=0.005811. Given R=4.1 mm, the result is z'=710.0 μm and Seps=62.5 μm, and the transmittance at these value is 66.8%. Therefore, it can be seen that light is attenuated by 33.2% due to bending in the optical fiber.

Figure 11:
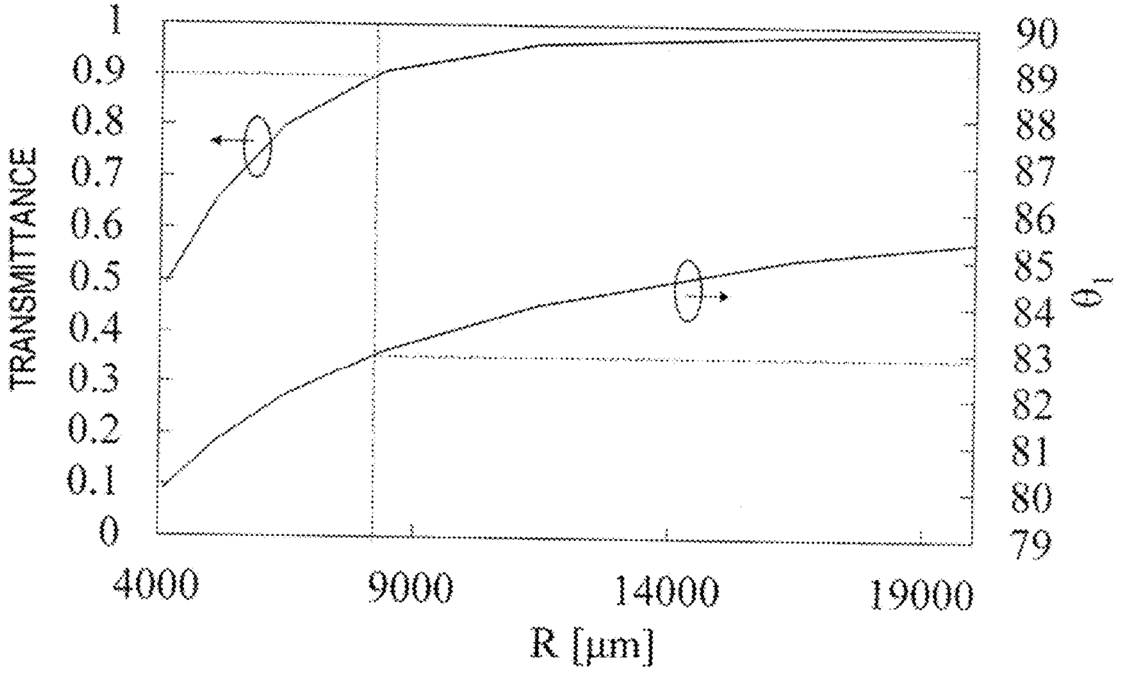
FIG. 11 is a graph for explaining the characteristics of the optical side input/output circuit of the present disclosure.

FIG. 11 illustrates the transmittance at the position of Seps=62.5 μm and θ1 at that position with a change in R. The transmittance is desirably 90% or more. On the basis of Seps=62.5 μm, given dt=8.4 μm and δn=0.005811, a transmittance of 90% or more can be achieved by setting R>8.2 mm.

Figure 12:
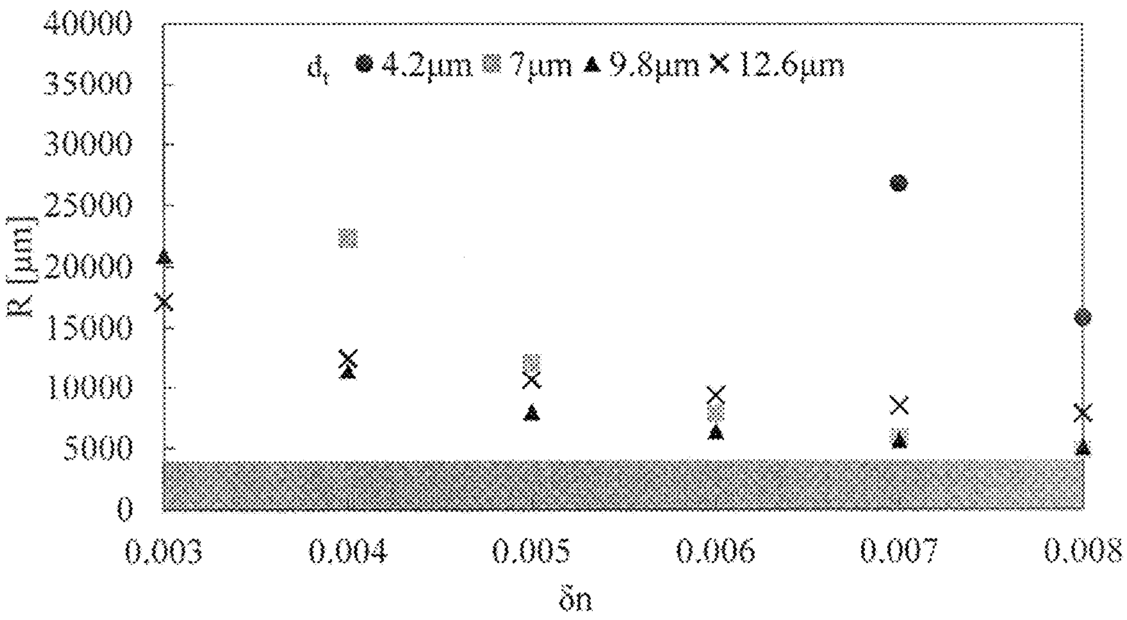
FIG. 12 is a graph for explaining the characteristics of the optical side input/output circuit of the present disclosure.

FIG. 12 illustrates the minimum value of R at which the transmittance is 90% or more on condition that the diameter dt of the tap waveguide 53 and the refractive index difference δn between the tap waveguide 53 and the cladding 52 are changed. As can be seen from FIG. 12, there is no waveguide structure having a transmittance of 90% or more in the region of R<4 mm, and the bending loss increases. Therefore, it can be said that θ1 can be reduced, with low loss maintained, by arranging the tap waveguide 53 in an arc shape such that R>4 mm.

As described above, when the tap waveguide is assigned to an outward curve with a position of the tap waveguide staying away from the core, light to the tap waveguide 53 or light from the tap waveguide 53 can be input or output with high efficiency.

Third Embodiment

Figure 6B:
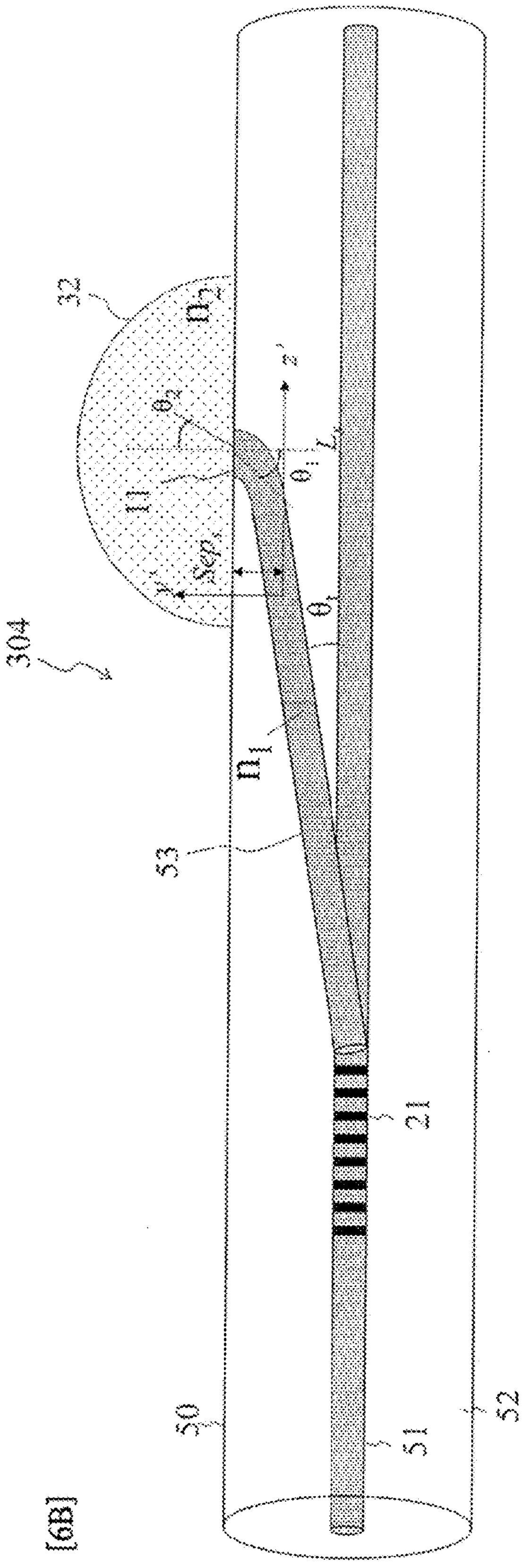
FIG. 6B is a diagram for explaining a structure of the optical side input/output circuit of the present disclosure.

FIG. 6B illustrates a structure of the optical side input/output circuit including the grating unit and the tap unit. In FIG. 6B, the reference numeral 11 denotes an emission end, 21 denotes a long-period fiber grating (LPG), 32 denotes a refractive index matching unit, 50 denotes an optical fiber, 51 denotes a core, 52 denotes a cladding, 53 denotes a tap waveguide, and 304 denotes an optical side input/output circuit.

From FIG. 4, θ2 can be reduced by increasing n2. However, it can be seen that, with n2 enlarged, the reflectance also increases, and it is difficult to allow light for being input into or output from the tap waveguide 53 with high efficiency. Therefore, the incident angle θ1 is decreased as in the second embodiment while enlarging n2 by providing the refractive index matching unit 32 as in the first embodiment. As illustrated in FIG. 6B, θ2 is reduced by bring the refractive index matching unit 32, having a refractive index higher than the refractive index n1 of the tap waveguide 53, into close contact with the emission end 11 of the optical fiber 50 and arranging the tap waveguide 53 so as to face outside.

Figure 5:
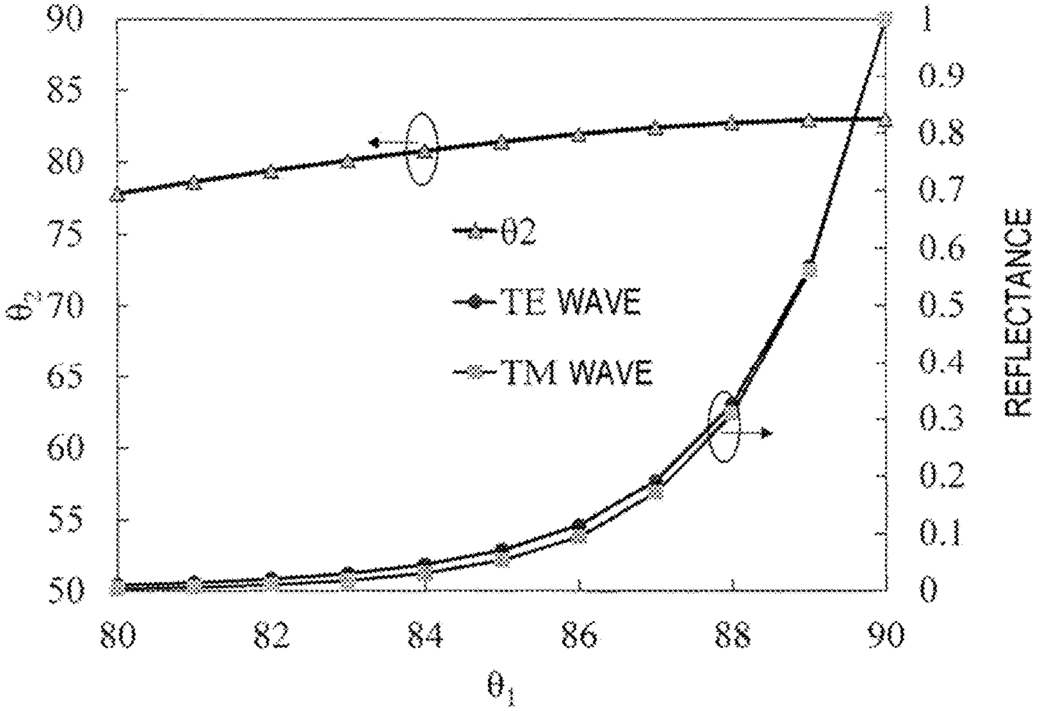
FIG. 5 is a graph for explaining the characteristics of the optical side input/output circuit of the present disclosure.

FIG. 5 illustrates the relationship between the emission angle θ2 and the reflectance on condition that n1=1.45 and n2=1.46 are set and the incident angle θ1 is changed. It can be seen that from FIG. 5 that, by bringing the refractive index matching unit 32, having a refractive index higher than the refractive index n1 of the tap waveguide 53, into close contact with the emission end 11 of the optical fiber 50 and by reducing θ1, the light from the tap waveguide 53 can be extracted with low reflectance. By reducing θ1 from 89.9 degrees, without bending, to 85 degrees, the reflectance can be improved from 94.4% to 6.3%.

Figure 13:
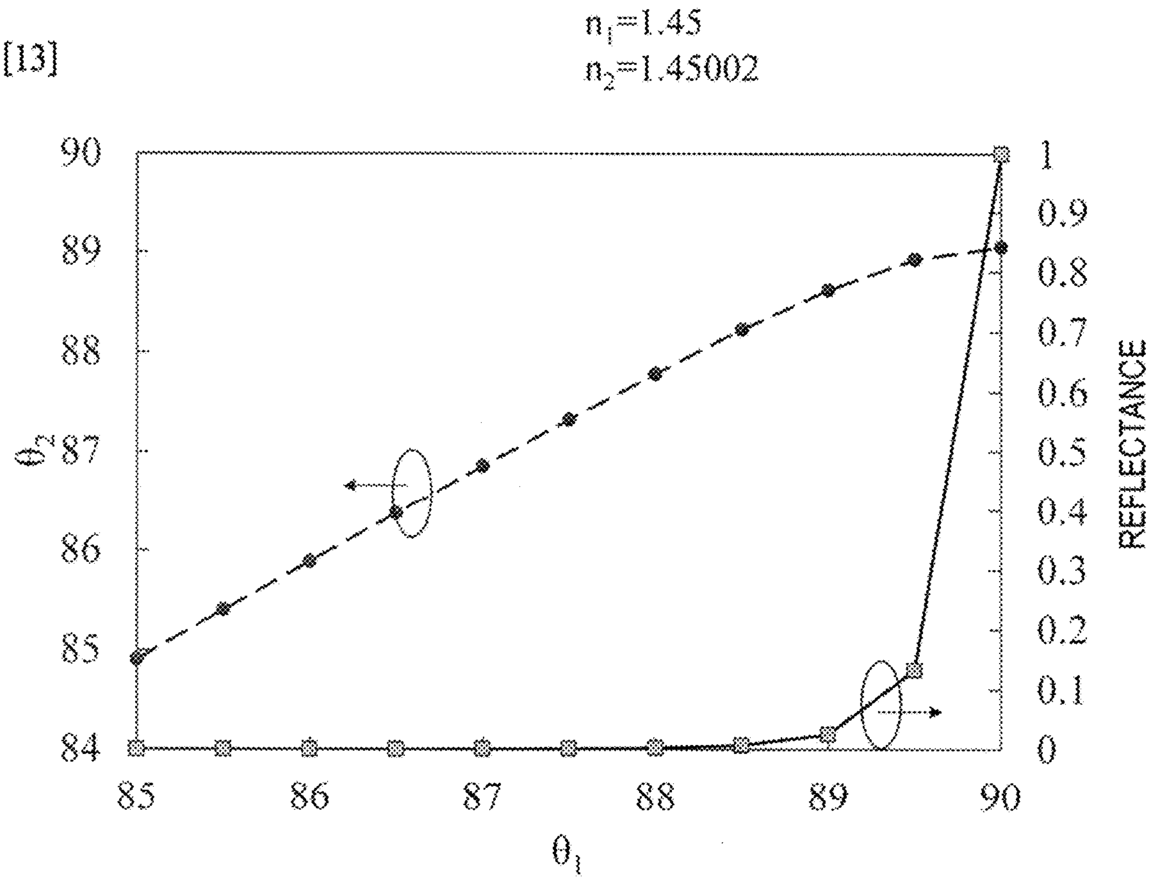
FIG. 13 is a graph for explaining the characteristics of the optical side input/output circuit of the present disclosure.

As the refractive index matching material, a refractive index tolerance 0.0002 is technically possible. FIG. 13 illustrates θ2 and the θ1 dependency of the reflectance on the basis of the minimum achievable refractive index difference n2-n1=0.0002. As can be seen from FIG. 13, the reflectance can be suppressed by setting θ1<89 degrees. When a radius of 62.5 μm of a general single mode fiber is used, R=410 mm is obtained by setting θ1=89 degrees. Therefore, in conjunction with the conclusion from FIG. 12, by setting R so as to satisfy $$4\ \text{mm} < R < 410\ \text{mm},$$

θ2 can be reduced while the reflectance is controlled, and the coupling efficiency can be improved.

As described above, by assigning the tap waveguide to an outward curve with a position of the tap waveguide staying away from the core and by providing the refractive index matching unit, having a refractive index higher than the refractive index n1 of the cladding, on the side surface of the optical fiber serving as the emission end of the tap waveguide, light to the tap waveguide 53 or light from the tap waveguide 53 can be input or output with high efficiency.

Fourth Embodiment

Figure 14A:
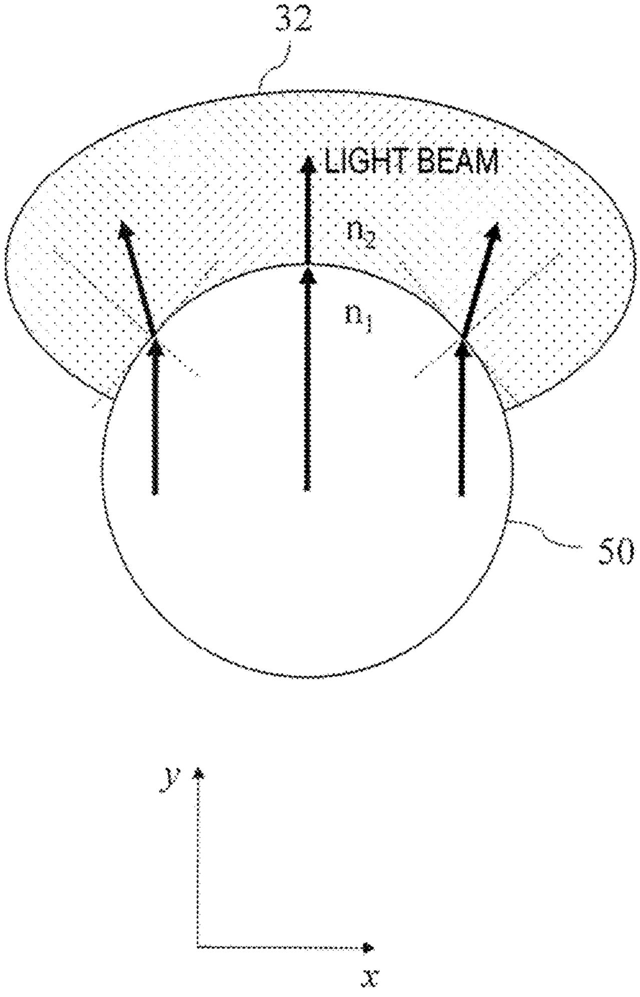
FIG. 14A is a diagram for explaining a structure of the optical side input/output circuit of the present disclosure.

FIG. 14A illustrates a schematic diagram of a light beam on an xy cross section of the optical fiber with the refractive index matching unit, which has a refractive index higher than the refractive index n1 of the tap waveguide, brought into close contact with the emission end of the tap waveguide. Under a condition of n2>n1, when light is emitted from the side surface of the cylindrical optical fiber 50 as illustrated in FIG. 14A, the beam spreads due to refraction, and it is difficult to couple the light to the light receiving fiber.

Figure 14B:
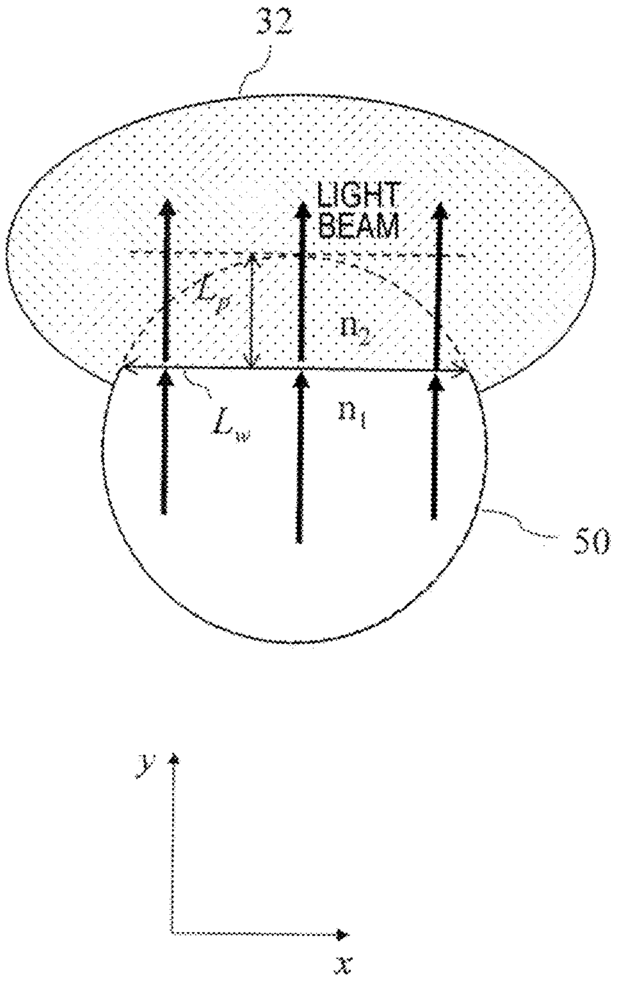
FIG. 14B is a diagram for explaining a structure of the optical side input/output circuit of the present disclosure.

In order to prevent the beam spread, as illustrated in FIG. 14B, the boundary surface between the optical fiber 50 and the refractive index matching unit 32 is flat in a cross section perpendicular to the longitudinal direction of the optical fiber 50. The side surface of the optical fiber 50 can be polished to be flat. In the structure of FIG. 14B, the light can be incident on the light receiving fiber with high efficiency by making the emission surface flat by using a general polishing machine. The side surface polishing of the optical fiber 50 can be achieved by fixing the optical fiber 50 to a V-groove array or the like and polishing the side surface. A polishing amount Lp is desirably small so that the incident angle θ1 can be reduced. On the other hand, when the polishing amount Lp is too small, all the emission ends of the tap waveguides cannot be made flat. Considering that the tap waveguide width is about 10 μm, the width Lw of the polished surface is desirably 20 μm or more in consideration of tolerance. The polishing amount Lp at this time is obtained from the following expression.

$$L_p = \frac{d_f}{2} - \sqrt{\left(\frac{d_f}{2}\right)^2 - \left(\frac{L_w}{2}\right)^2} \quad \text{[Math. 6]}$$

Here, df is the diameter of the optical fiber 50. Given df=125 μm, Lp needs to be 0.8 μm or more. Lw can be checked using a microscope.

Figure 14C:
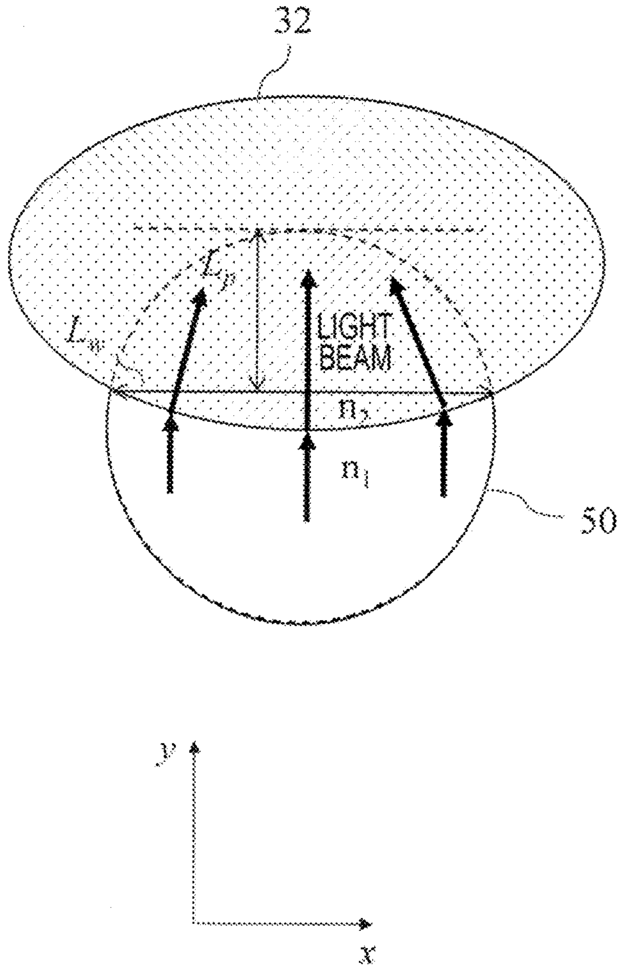
FIG. 14C is a diagram for explaining a structure of the optical side input/output circuit of the present disclosure.

When a boundary surface between the optical fiber 50 and the refractive index matching unit 32 is recessed in a center axis direction of the optical fiber 50 in a cross section perpendicular to a longitudinal direction of the optical fiber 50, a light collection effect can be obtained. By polishing the side surface of the optical fiber 50, the recessed shape can be obtained. As illustrated in FIG. 14C, when polishing into a recessed shape is performed, the beam is refracted in a direction in which the beam is condensed, so that beam spreading can be controlled. In the structure of FIG. 14C, the light can be incident on the light receiving fiber with high efficiency by making the emission surface recessed by using a general polishing machine. The side surface polishing of the optical fiber 50 can be achieved by fixing the optical fiber 50 to a V-groove array or the like and polishing the side surface.

As described above, by making the boundary surface between the optical fiber and the refractive index matching unit flat or recessed in the center axis direction of the optical fiber in the cross section perpendicular to the longitudinal direction of the optical fiber, light can be input into and output from the side surface of the optical fiber with high efficiency.

Simulations

It is practical to input light into or to output light from the light receiving fiber with higher efficiency by using a combination of: providing the refractive index matching unit, having a refractive index higher than the refractive index n1 of the cladding, on the side surface of the optical fiber to be the emission end of the tap waveguide; assigning the tap waveguide to an outward curve with a position of the tap waveguide staying away from the core; and making the boundary surface between the optical fiber and the refractive index matching unit flat or recessed in a center axis direction of the optical fiber in the cross section perpendicular to the longitudinal direction of the optical fiber, which are described in the first to fourth embodiments.

Figure 15:
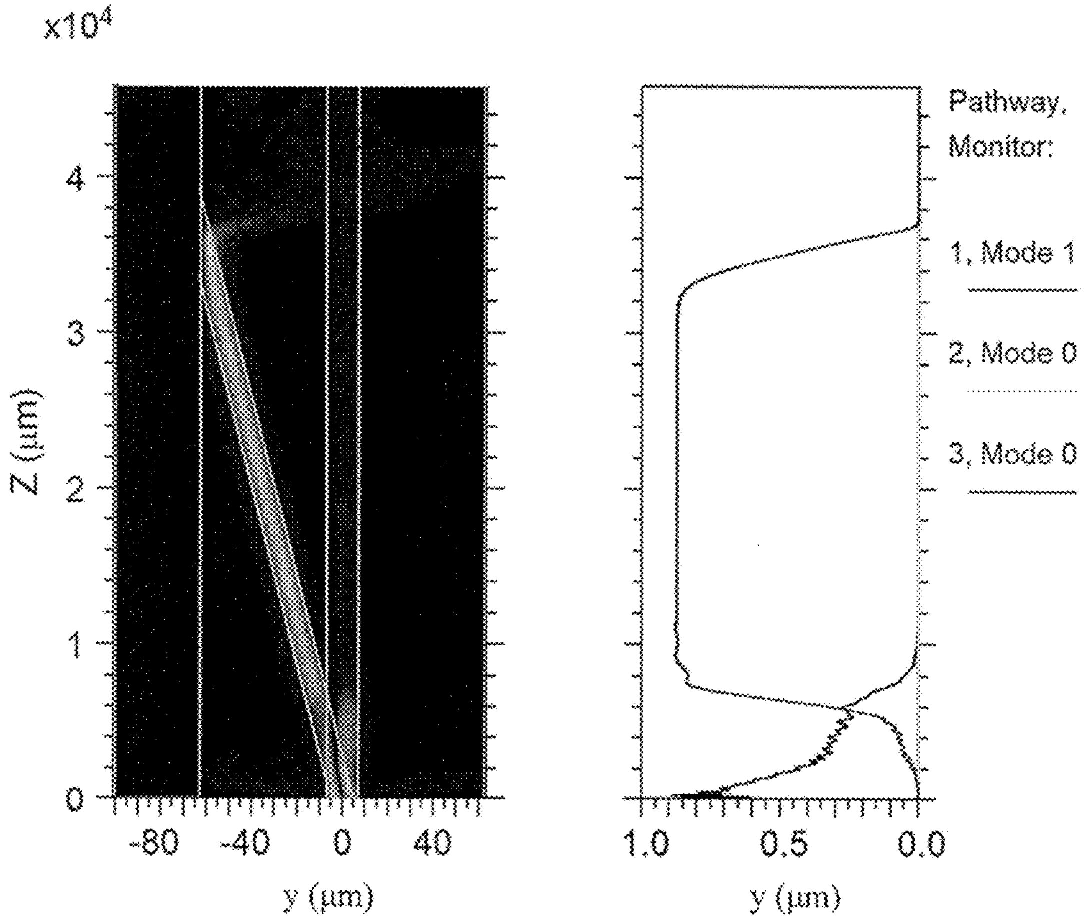
FIG. 15 is a graph for explaining the characteristics of the optical side input/output circuit of the present disclosure.

FIG. 15 illustrates an electric field distribution of the tap waveguide where the above three technologies are not applied. It can be seen from FIG. 15 that reflection occurs at the interface between the cladding and air at the emission end, and no light is emitted outside the optical fiber.

Figure 16:
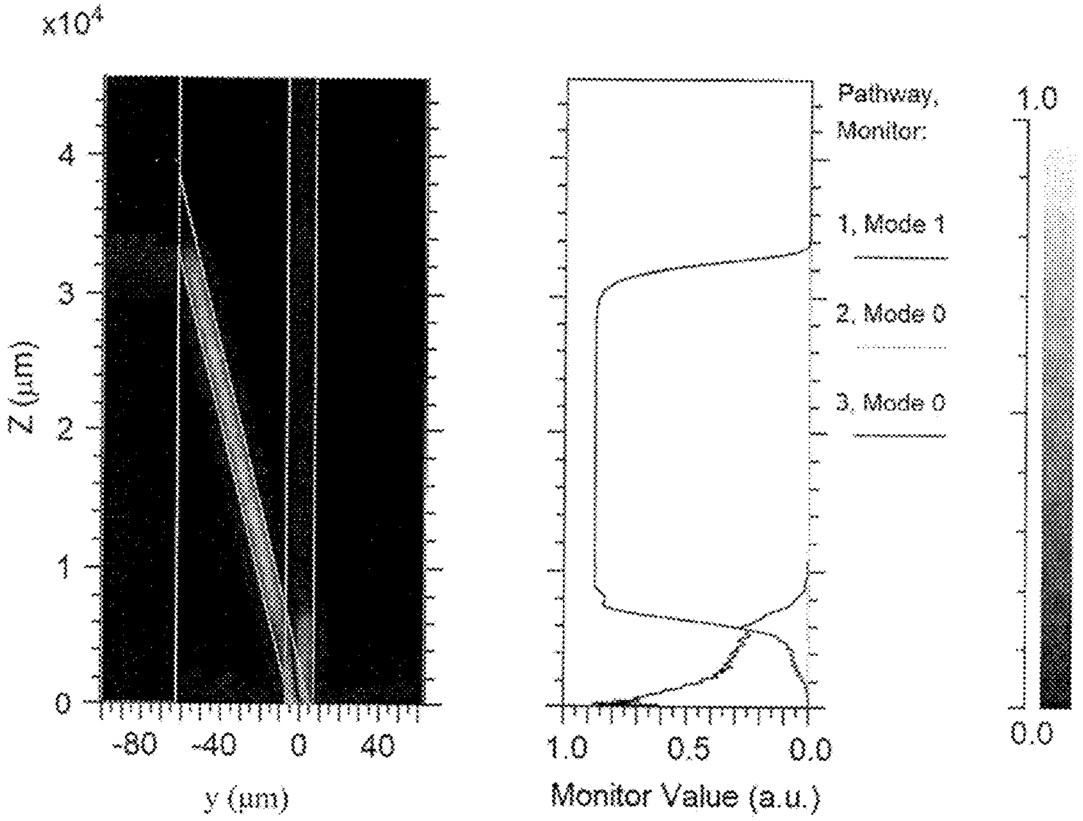
FIG. 16 is a graph for explaining the characteristics of the optical side input/output circuit of the present disclosure.

FIG. 16 illustrates an electric field distribution where the refractive index matching unit having a refractive index n2=1.46, higher than the refractive index n1 of the cladding, is provided on the side surface of the optical fiber, serving as the emission end of the tap waveguide, and the boundary surface between the optical fiber and the refractive index matching unit is made flat. Compared with FIG. 15, the light is emitted to the outside of the optical fiber, but the reflection is still large and the coupling amount is small.

Figure 17A:
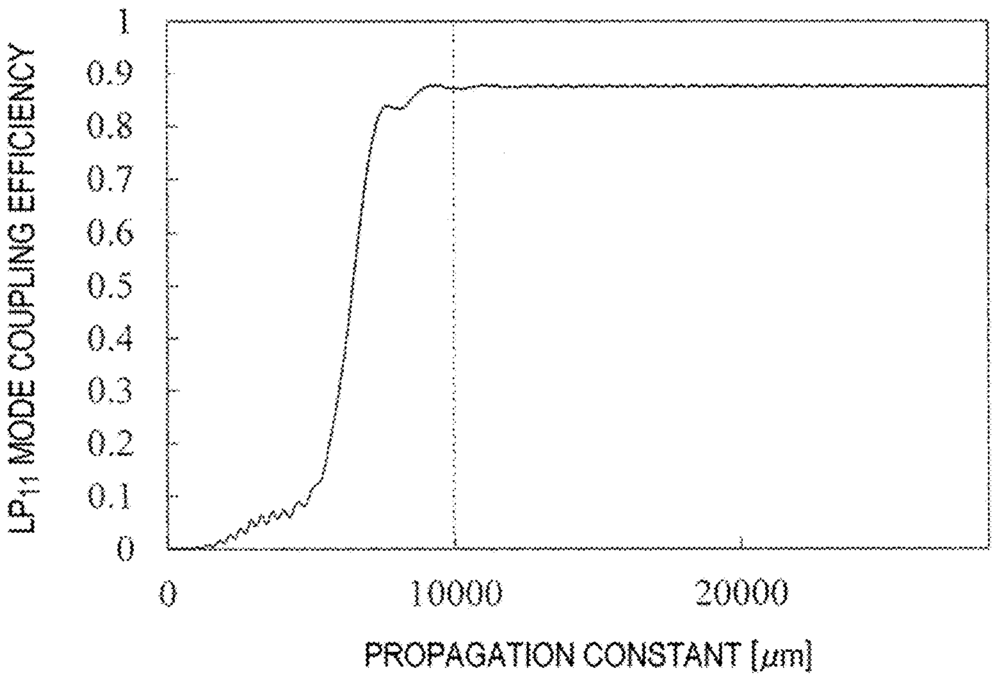
FIG. 17A is a graph for explaining the characteristics the optical side input/output circuit of the present disclosure.
Figure 17B:
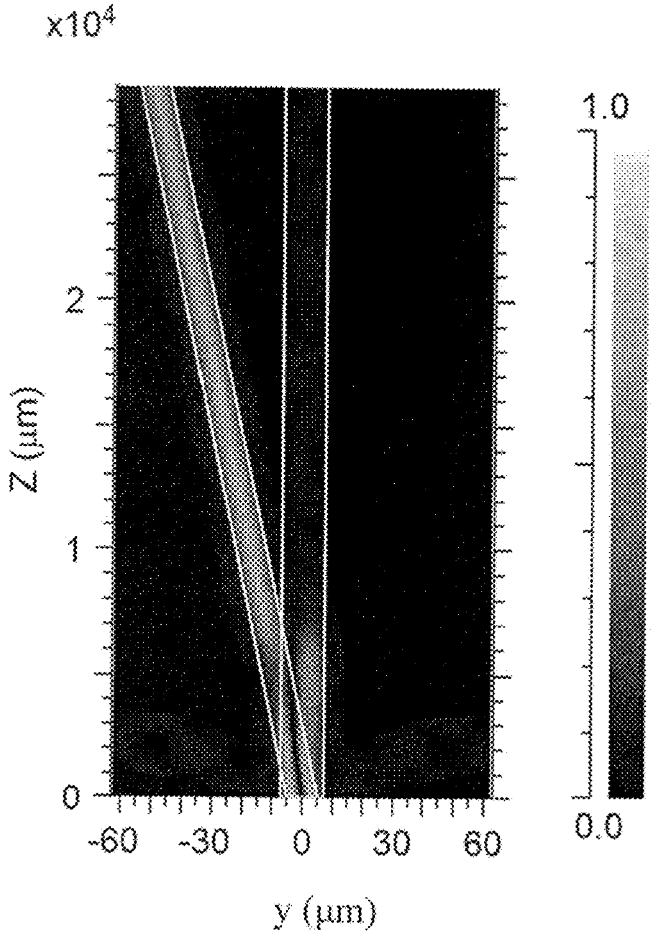
FIG. 17B is a graph for explaining the characteristics of the optical side input/output circuit of the present disclosure.

FIGS. 17A and 17B illustrate the results of assigning the linear tap waveguides. FIG. 17A illustrates the propagation distance dependence of the coupling efficiency to the tap waveguide regarding incidence of the LP11 mode. FIG. 17B illustrates the electric field distribution regarding that incidence. θ1=0.1 degrees, dt=9.8 μm, and δn=0.006 were set so that the light was sufficiently coupled to the tap waveguide. It can be seen from FIG. 17A that the LP11 mode is sufficiently coupled to the tap waveguide in the vicinity of 10000 μm. The y coordinate at the point of z=10000 μm is 17.5 μm. As a result, y=17.5 μm and z=10,000 μm are set as the initial position of the y' and z' coordinates and the start point of the curve.

Figure 18A:
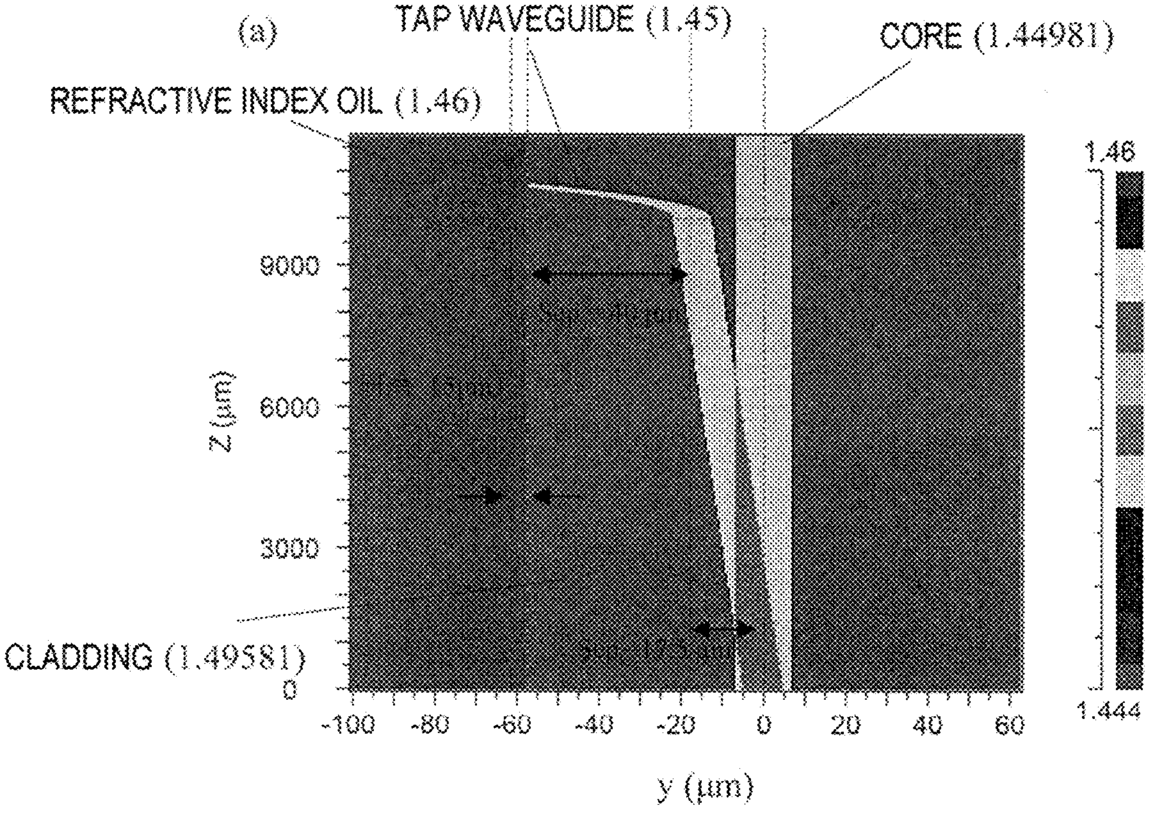
FIG. 18A is a graph for explaining the characteristics of the optical side input/output circuit of the present disclosure.
Figure 18B:
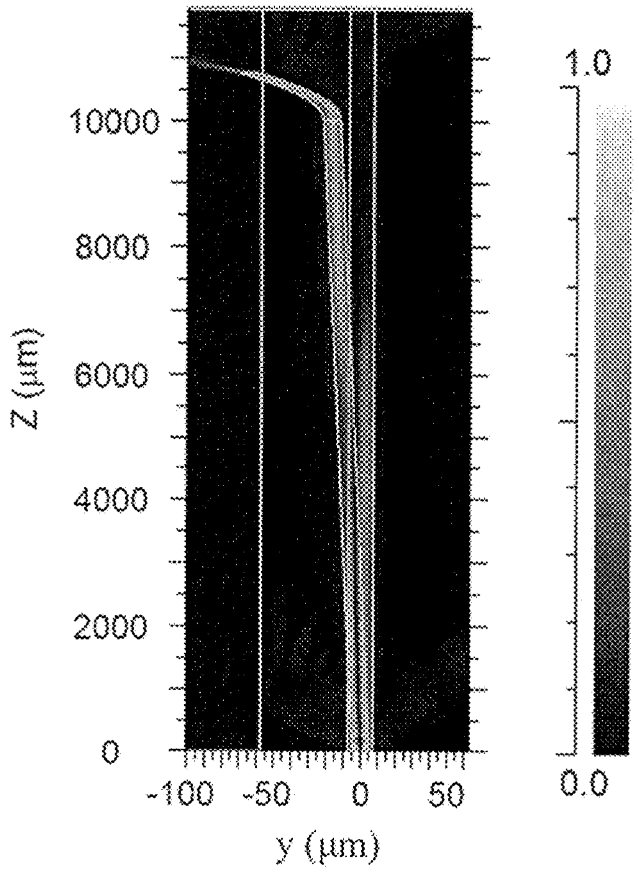
FIG. 18B is a graph for explaining the characteristics of the optical side input/output circuit of the present disclosure.

The maximum value of R, at which the bending loss was 10% or less at dt=9.8 μm and δn=0.006, was calculated, and R=7025.3 μm was set. FIG. 18A illustrates a refractive index distribution on the assumption that the tap waveguide is bent from y=17.5 μm and z=10000 μm into an arc shape of R=7025.3 μm and assigned to the arc shape, polishing is performed by 5 μm from the optical fiber end surface, and the emission end is filled with a refractive index matching material of n2=1.46. On this assumption, FIG. 18B illustrates the electric field distribution regarding incidence of the LP11 mode. Assuming that the cladding outer diameter is 125 μm considering polishing by 5 μm, Seps=40.0 μm is obtained. On this assumption, θ1=6.12 and θ2=6.07 are obtained. As can be seen from FIG. 18B, the incident LP11 mode is coupled to the tap waveguide, and is emitted out of the optical fiber at an angle with a small loss in the curve. In regards to this matter, about 80% of the incident power is emitted to the outside of the optical fiber, which can be greatly improved as compared with FIG. 15. It can be seen that by bringing the light receiving fiber close to the emission port, the emitted light is coupled to the light receiving fiber, and control of the optical path can be achieved.

Fifth Embodiment

Figure 19:
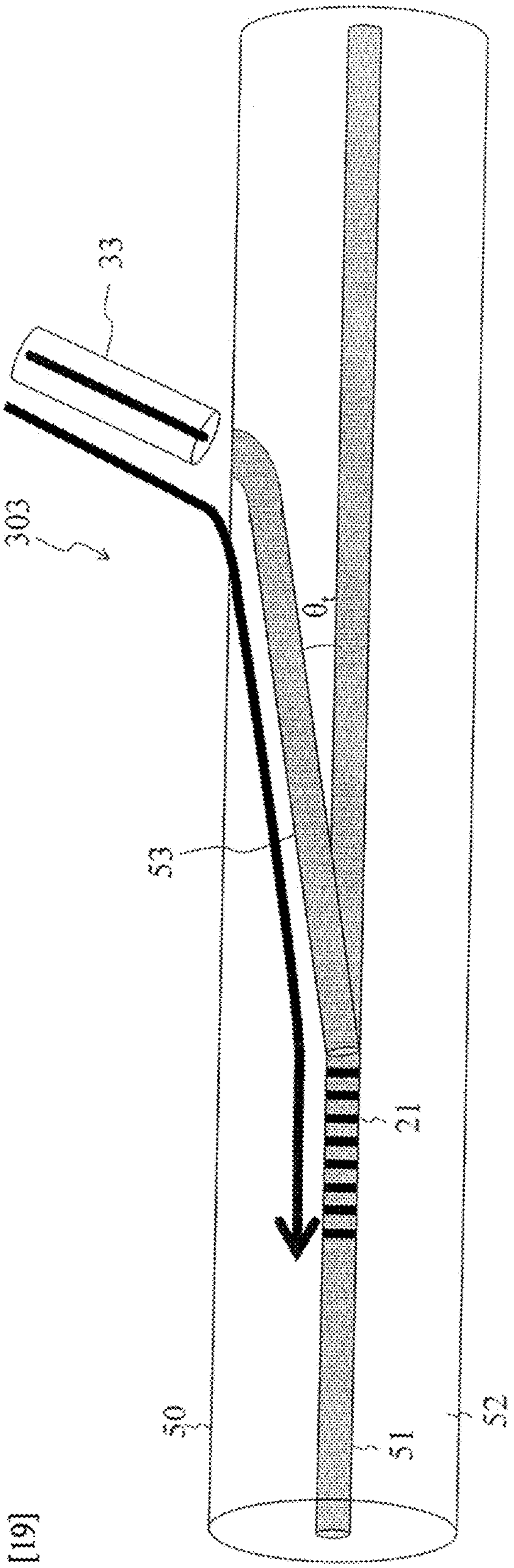
FIG. 19 is a diagram for explaining a structure of the optical side input/output circuit of the present disclosure.

In the first to fourth embodiments, the technology of emitting light of a specific wavelength from the optical fiber to the outside has been described. These technologies can also be applied as technologies of side inputting by irradiating the tap waveguide with light from the input/output optical fiber. FIG. 19 is a schematic diagram of inputting a light beam.

In FIG. 19, the reference numeral 11 denotes an emission end, 21 denotes a long-period fiber grating (LPG), 33 denotes an input/output optical fiber, 50 denotes an optical fiber, 51 denotes a core, 52 denotes a cladding, 53 denotes a tap waveguide, and 303 denotes an optical side input/output circuit.

The light emitted from the input/output optical fiber 33 is coupled to the tap waveguide 53, converted from the tap waveguide 53 to the LP11 mode, and coupled to the core. The LP11 mode is converted into the basic mode in the long-period fiber grating 21, which propagates through the core 51. The technology of side inputting may be applied to any of the first to fourth embodiments.

Therefore, according to the technology of the present disclosure, it is practical to provide an optical side input/ output circuit for allowing light for being input into or output from the light receiving fiber with high efficiency.

INDUSTRIAL APPLICABILITY

The present disclosure can be applied to optical communication industries.

REFERENCE SIGNS LIST

10 Tap unit
11 Emission end
20 Grating unit
21 Long-period fiber grating (LPG)
30 Light receiving fiber
31 Mirror
32 Refractive index matching unit
33 Input/output optical fiber
50 Optical fiber
51 Core
52 Cladding
53 Tap waveguide
301 to 304 Optical side input/output circuit

The invention claimed is:

1. An optical side input/output circuit comprising:

a tap unit including a tap waveguide having a first refractive index that is different than a second refractive index of a cladding of an optical fiber, the tap unit configured to allow light propagation through a core of the optical fiber for being input into or output from a side surface of the optical fiber; and a refractive index matching unit, having a third refractive index higher than the first refractive index of the tap waveguide, on the side surface of the optical fiber where the light is allowed for being input or output by the tap waveguide.

2. The optical side input/output circuit according to claim 1, wherein the tap waveguide is assigned linearly with an assignment in the cladding approaching the core of the optical fiber and assigned to an outward curve with the assignment in the cladding staying away from the core.

3. The optical side input/output circuit according to claim 2, wherein the curve is a part of an arc.

4. The optical side input/output circuit according to claim 3, wherein a radius of the arc is larger than 4 mm and smaller than 410 mm.

5. The optical side input/output circuit according to claim 2, further comprising a grating unit in which a grating is formed for converting light of a basic mode, with a desired wavelength transmitted therethrough, of the light for propagation through the core of the optical fiber to light of a higher-order mode, wherein the tap unit allows the light of the higher-order mode, finishing transmission through the grating unit, for being input into or output from the side surface of the optical fiber.

6. The optical side input/output circuit according to claim 2, further comprising a grating unit in which a grating is formed for reflecting light, with a desired wavelength, of the light for propagation through the core of the optical fiber, wherein the tap unit allows the light, reflected by the grating unit, for being input into or output from the side surface of the optical fiber.

7. The optical side input/output circuit according to claim 2, wherein a boundary surface between the optical fiber and the refractive index matching unit is flat in a cross section perpendicular to a longitudinal direction of the optical fiber.

8. The optical side input/output circuit according to claim 2, wherein a boundary surface between the optical fiber and the refractive index matching unit is recessed in a center axis direction of the optical fiber in a cross section perpendicular to a longitudinal direction of the optical fiber.

9. The optical side input/output circuit according to claim 1, further comprising a grating unit in which a grating is formed for reflecting light, with a desired wavelength, of the light for propagation through the core of the optical fiber, wherein the tap unit allows the light, reflected by the grating unit, for being input into or output from the side surface of the optical fiber.

10. The optical side input/output circuit according to claim 1, wherein a boundary surface between the optical fiber and the refractive index matching unit is flat in a cross section perpendicular to a longitudinal direction of the optical fiber.

11. The optical side input/output circuit according to claim 1, wherein a boundary surface between the optical fiber and the refractive index matching unit is recessed in a center axis direction of the optical fiber in a cross section perpendicular to a longitudinal direction of the optical fiber.

12. An optical side input/output circuit comprising:

a tap unit including a tap waveguide having a first refractive index that is different than a second refractive index of a cladding of an optical fiber, the tap unit configured to allow light propagation through a core of the optical fiber for being input into or output from a side surface of the optical fiber;

a refractive index matching unit, having a third refractive index higher than the first refractive index of the tap waveguide, on the side surface of the optical fiber where the light is allowed for being input or output by the tap waveguide; and a grating unit in which a grating is formed for converting light of a basic mode, with a desired wavelength transmitted therethrough, of the light for propagation through the core of the optical fiber to light of a higher-order mode, wherein the tap unit is configured to allow the light of the higher-order mode, finishing transmission through the grating unit, for being input into or output from the side surface of the optical fiber.

* * * * *